US011258756B2

(12) United States Patent
Huang et al.

(10) Patent No.: US 11,258,756 B2
(45) Date of Patent: Feb. 22, 2022

(54) AUTHENTICATING TO A HYBRID CLOUD USING INTRANET CONNECTIVITY AS SILENT AUTHENTICATION FACTOR

(71) Applicant: Citrix Systems, Inc., Fort Lauderdale, FL (US)

(72) Inventors: Feng Huang, Girton (GB); Andrew David Cooper, Royston (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 598 days.

(21) Appl. No.: 16/190,954

(22) Filed: Nov. 14, 2018

(65) Prior Publication Data

US 2020/0153792 A1    May 14, 2020

(51) Int. Cl.
*H04L 29/06* (2006.01)
(52) U.S. Cl.
CPC ...... *H04L 63/0236* (2013.01); *H04L 63/0838* (2013.01)
(58) Field of Classification Search
CPC ............. H04L 63/0236; H04L 63/0838; H04L 63/0884; H04L 63/10
See application file for complete search history.

(56) References Cited

U.S. PATENT DOCUMENTS

| 9,491,141 B2 | 11/2016 | Carbou et al. | |
| 10,992,670 B1* | 4/2021 | Drooger | H04L 12/4641 |
| 2003/0074584 A1* | 4/2003 | Ellis | H04L 63/0272 726/22 |
| 2005/0166263 A1* | 7/2005 | Nanopoulos | H04L 9/3228 726/7 |
| 2006/0143292 A1 | 6/2006 | Taubenheim et al. | |

(Continued)

FOREIGN PATENT DOCUMENTS

| WO | 2003050700 A1 | 6/2003 |
| WO | 2003075125 A2 | 9/2003 |
| WO | 2017205241 A1 | 11/2017 |

OTHER PUBLICATIONS

Indu I et al: "Encrypted token based authentication with adapted SAML technology for cloud web services", Journal of Network and Computer Applications, vol. 99,, Dec. 1, 2017 (Dec. 1, 2017), pp. 131-145, XP085279125, ISSN: 1084-8045, DOI: 10.1016/J.JNCA.2017.10.001, p. 133-p. 135.

(Continued)

*Primary Examiner* — Shanto Abedin
(74) *Attorney, Agent, or Firm* — BainwoodHuang

(57) ABSTRACT

A technique for performing authentication to a hybrid-cloud service includes selectively applying varying authentication requirements based on whether a client device can be confirmed to be connected to a private intranet. The technique includes operating a set of local agents on one or more computing machines on the intranet. When a client device requests access to the hybrid-cloud service, the client device attempts to contact one or more of the local agents. If the client device succeeds in contacting a local agent, then the client device is confirmed to be connected to the private intranet and receives relatively trusting treatment during authentication. However, if the client device fails to contact at least one local agent, the client device is not confirmed to be connected to the private intranet and receives relatively less trusting treatment.

19 Claims, 4 Drawing Sheets

(56) References Cited

U.S. PATENT DOCUMENTS

| | | | |
|---|---|---|---|
| 2007/0277231 A1* | 11/2007 | Medvinsky | H04L 63/0815 |
| | | | 726/5 |
| 2013/0244684 A1 | 9/2013 | Kadous et al. | |
| 2013/0262857 A1* | 10/2013 | Neuman | H04L 63/18 |
| | | | 713/155 |
| 2014/0208393 A1* | 7/2014 | Yasukawa | H04L 67/14 |
| | | | 726/4 |
| 2015/0012977 A1 | 1/2015 | Huh et al. | |
| 2015/0121465 A1 | 4/2015 | Berns et al. | |
| 2015/0180868 A1* | 6/2015 | Sng | G06F 12/121 |
| | | | 726/9 |
| 2015/0319174 A1* | 11/2015 | Hayton | H04L 63/0815 |
| | | | 726/7 |
| 2016/0050076 A1* | 2/2016 | Jin | H04L 63/0884 |
| | | | 705/44 |
| 2016/0330177 A1 | 11/2016 | Singleton, IV et al. | |
| 2017/0257215 A1* | 9/2017 | Huang | H04L 63/083 |
| 2020/0137042 A1* | 4/2020 | Kannan, III | H04L 63/0823 |

OTHER PUBLICATIONS

PCT/US2019/061422, Notification of Transmittal of the International Search Report and the Written Opinion of the International Searching Authority, or the Declaration, 15 pages, dated Feb. 10, 2020.

* cited by examiner

AUTHENTICATING TO A HYBRID CLOUD USING INTRANET CONNECTIVITY AS SILENT AUTHENTICATION FACTOR

BACKGROUND

Companies and other organizations increasingly turn to hybrid-cloud solutions for their computer processing and storage needs. As is known, the term "hybrid cloud" refers to a computing model that involves a mixture of private cloud services, which run on-premises on a local intranet, and public cloud services, which run off-premises on the public Internet. Many applications and other computing services can benefit from hybrid-cloud deployments, such as desktop virtualization, application virtualization, and file storage, for example.

Some hybrid-cloud deployments aim to make a computing service simpler to access for users who are running their computers on a tenant's premises, where the "tenant" is the organization that owns, leases, and/or subscribes to the computing service. For example, a user working on a laptop in the tenant's office might be able to log on to a hybrid cloud service with just a username and a password, whereas the same user logging on from home might have to enter additional information, such as a security token, a biometric scan, or the like. The difference in access requirements arises from the greater security risks that typically accompany access over the public Internet.

Some tenants use source IP (Internet Protocol) addresses to distinguish between access requests originating on-premises from those arriving over the public Internet. For example, a tenant might maintain a whitelist of IP address ranges that correspond to computers located on-premises. If an access request arrives from a computer whose IP address is on the whitelist, then that computer might be prompted for relatively trusting authentication, such as just a username and password. But if an access request arrives from a computer whose IP address is not on the whitelist, then the computer might be prompted for relatively strong authentication, such as a pre-issued token, a fingerprint scan, or some other authentication factor, in addition to a username and password.

SUMMARY

Unfortunately, distinguishing between on-premises and off-premises login requests based on source IP address can be unreliable and difficult to administer. For example, malicious users can spoof source IP addresses. This may be done trivially with UDP (User Datagram Protocol) by modifying a source IP address field in a request. TCP (Transmission Control Protocol) requests are more difficult to spoof than are UDP requests, but instances of source IP address spoofing over TCP have been reported. Thus, basing authentication strength requirements on IP address ranges can be a risky endeavor. It can also place burdens on administrators. For example, an administrator needs to maintain careful records of which IP address ranges are on the whitelist and which are not. Keeping the whitelist current can be a challenge, however, as network configurations change, new sites come online, others go offline, and so forth. What is needed is a more reliable and administrable way of providing on-premises login requests with easier login requirements than those provided for off-premises login requests.

In contrast with the prior approach, an improved technique for performing authentication to a hybrid-cloud service includes selectively applying varying authentication requirements based on whether a client device can be confirmed to be connected to a private intranet. The technique includes operating a set of local agents on one or more computing machines on the intranet. When a client device requests access to the hybrid-cloud service, the client device attempts to contact one or more of the local agents. If the client device succeeds in contacting a local agent, then the client device is confirmed to be connected to the private intranet and receives relatively trusting treatment during authentication. However, if the client device fails to contact at least one local agent, the client device is not confirmed to be connected to the private intranet and receives relatively less trusting treatment. For example, a user of an unconfirmed machine may be required to supply an additional authentication factor.

Advantageously, the improved technique provides a more reliable way of determining whether a client device is inside or outside a private intranet than the use of source IP addresses. The improved technique is thus more secure and resistant to hacking than is the prior approach. It is also easier to administer, as there is no need to provide or maintain whitelists of trusted IP addresses.

Certain embodiments are directed to a method of authenticating users to a hybrid-cloud service. The method includes operating a set of local agents on respective computing machines connected to a private intranet, the private intranet connected to a public network via a gateway, the gateway configured to block incoming connection requests arriving over the public network and directed to any of the set of local agents. In response to (i) receipt from a first client device of a first resource request for accessing a cloud resource of the hybrid-cloud service and (ii) a reachable agent of the set of agents then receiving an incoming connection request from the first client device, the method further comprises (a) transmitting a silent authentication factor to the first client device, the silent authentication factor providing an indication that that first client device is connected to the private intranet, (b) receiving a first authentication request from the first client device, the first authentication request specifying a first set of authentication factors which includes the silent authentication factor, and (c) performing a first authentication operation on the first authentication request.

Other embodiments are directed to an electronic system constructed and arranged to perform a method of authenticating users to a hybrid-cloud service, such as the method described above. Still other embodiments are directed to a computer program product. The computer program product stores instructions which, when executed on control circuitry of an electronic system, cause the electronic system to perform a method of authenticating users to a hybrid-cloud service, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for performing authentication to a hybrid-cloud service includes selectively applying varying authentication requirements based on whether a client device can be confirmed to be connected to a private intranet. The technique promises to be more reliable and easily administrable than previous approaches, which rely upon IP address lists to distinguish between on-site and off-site login requests.

Figure 1:
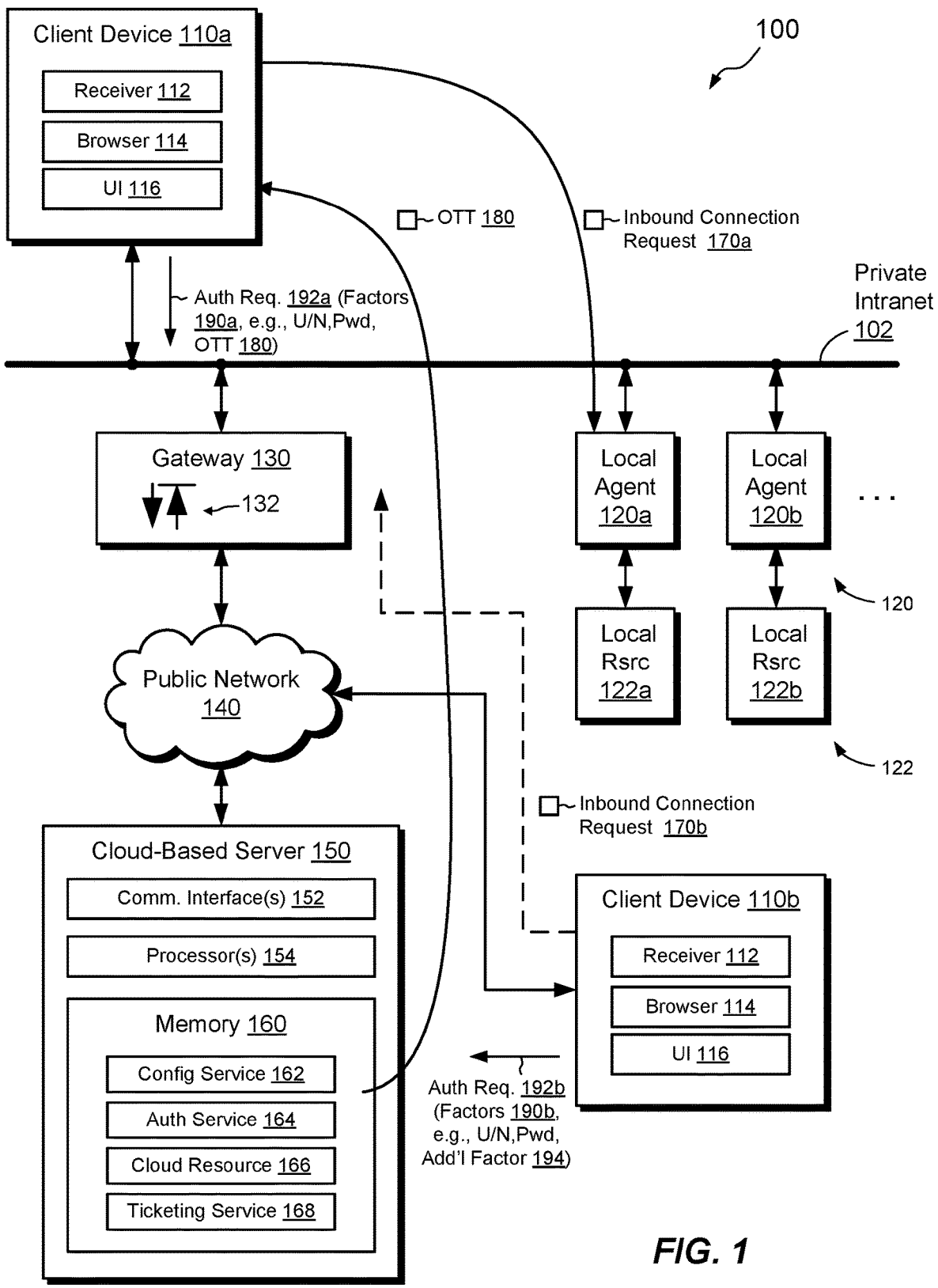
FIG. 1 is a block diagram of an example environment in which embodiments of the improved technique can be practiced.

FIG. 1 shows an example environment 100 in which embodiments of the improved technique can be practiced. Here, a private intranet 102 operatively connects to a public network 140 via a gateway 130. Each of a set of local agents 120 (e.g., one or more local agents 120a, 120b, etc.) runs on a respective computing machine and connects to the private intranet 102 and to a respective local resource 122 (e.g., one of 122a, 122b, etc.). A cloud-based server 150 connects to the public network 140 and hosts a cloud resource 166. In an example, the cloud resource 166 is a public-cloud component of a hybrid-cloud service, which includes both the cloud resource 166 and one or more of the local resources 122.

Also shown in FIG. 1 are client devices 110 (e.g., 110a, 110b, etc.). Any number of client devices 110 may be used. By way of non-limiting example, each client device 110 includes a receiver 112, a browser 114, and a user interface (UI) 116, such as a keyboard, pointer, mouse, touchscreen, display, etc. Suitable examples of client devices 110 include desktop computers, laptop computers, tablet computers, smart phones, personal data assistants, set top boxes, gaming consoles, Internet-of-Things devices, and the like—essentially, any device capable of running software and connecting to a network. The receiver 112 is a software component installed on a client device 110 to facilitate operation with the hybrid-cloud service. One should appreciate that the functionality described herein for the receiver 112 may alternatively be realized by other software components, or combinations of software components, such that a specific receiver component 112 is not required.

The private intranet 102 may be realized as a LAN (local area network), as multiple LANs connected together, as a WAN (wide area network), or as any combination of LANs and/or WANs, for example. In an example, the private intranet 102 is owned, leased, or operated by an organization that is a tenant of the hybrid-cloud service. The gateway 130 may be realized as a computer, as a dedicated hardware device, or as multiple such computers and/or devices. The gateway 130 is configured to isolate the private intranet 102 from the public network 140 but to permit certain allowed traffic to pass therebetween based on rules. For example, the gateway 130 may include a firewall 132 configured to block incoming connection requests from the public network 140 but to allow outgoing connection requests from the private intranet 102 to the public network 140. Thus, devices on the private intranet 102 may call out to any servers or devices on the public network 140, but devices that are not on the private intranet 102 may not call in from the public network 140, as such calls are blocked by the firewall 132. Although the firewall 132 may allow certain exceptions (cases where incoming requests are allowed), exceptions are not generally made for the local agents 120, which are thus not allowed to receive incoming connection requests from the public network 140. The public network 140 may itself be the Internet or some other public network.

In an example, the cloud-based server 150 includes one or more communication interfaces 152, a set of processors 154, and memory 160. The communication interfaces 152 include, for example, network interface adapters for converting electronic and/or optical signals received over the public network 140 to electronic form for use by the cloud-based server 150. The set of processors 154 includes one or more processing chips and/or assemblies. The memory 150 includes both volatile memory, e.g., Random Access Memory (RAM), and non-volatile memory, such as one or more ROMs (Read-Only Memories), disk drives, solid state drives, and the like. The set of processors 154 and the memory 160 together form control circuitry, which is constructed and arranged to carry out various methods and functions as described herein. Also, the memory 160 includes a variety of software constructs realized in the form of executable instructions. When the executable instructions are run by the set of processors 154, the set of processors 154 carry out the operations of the software constructs. Although certain software constructs are specifically shown and described, it is understood that the memory 160 typically includes many other software components, which are not shown, such as an operating system, various applications, processes, and daemons. Although the cloud-based server 150 is shown as a single computer server, it may be implemented using any number of physical computers, such as a single server or a server cluster.

In an example, the memory 160 "includes," i.e., realizes by execution of software instructions, a configuration service 162, an authentication service 164, the above-mentioned cloud resource 166, and a ticketing service 168. Not all examples and embodiments require all of the components 162, 164, 166, and 168, however. When provided, the components 162, 164, 166, and 168 may run on a single computer server (as shown), on respective computer servers, on virtual machines, or in any suitable manner.

In example operation, client devices 110 access a hybrid-cloud service both from inside the private intranet 102 and from outside the private intranet 102, but authentication requirements differ in the two cases based on whether the client machines 110 can be confirmed to be connected to the private intranet 102. For example, on-premises client devices 110 may be presented with authentication requirements that are relatively easy for users to perform, such as just a username and password, whereas off-premises client devices 110 are less trusted and may be presented with authentication requirements that are relatively hard for users to perform, such as a username, a password, and a passcode. In accordance with improvements hereof, client machines 110 confirmed to be on-premises use a silent authentication factor, which strengthens authentication without requiring users to enter a separate passcode or other factor.

For example, assume that client device 110a is connected to the private intranet 102 but that client device 110b is not. For instance, client device 110a is a desktop computer located on the premises of the tenant, with a wired or wireless connection to the private intranet 102, whereas client device 110b is a laptop computer or smart phone located off-premises, at a user's home and connected to the public network 140.

If a user of client device 110a wishes to access the hybrid-cloud service, the user may enter a command on the client device 110a. The command directs the client device 110a to issue an inbound connection request 170a to a local agent 120. For example, the client device 110a previously obtained an agent list of local agents 120a from the cloud-based server 150, and the client device 110a attempts to contact one or more of the local agents on the agent list. As the client device 110a has a connection to the private intranet 102, the client device 110a is able to contact the local agent 120a (and possibly other local agents) without being blocked by the firewall 132. In response to receiving the inbound connection request 170a, the local agent 120 makes an outgoing call to the cloud-based server 150, directing the cloud-based server 150 to issue a silent authentication factor, such as a one-time token (OTT) 180, which the cloud-based server 150 returns to the client device 110a via the local agent 120. The client device 110a then gathers authentication factors from the user, such as just a username and password, and adds to those factors the silent authentication factor (e.g., OTT 180) to make up a first set of authentication factors 190a. The client device 110a then sends this first set of authentication factors 190a to the cloud-based server 150 in an authentication request 192a. The authentication service 164 performs an authentication operation which, if successful, allows the user of the client machine 110a to access the cloud resource 166. The user of client device 110a thus has a relatively easy time authenticating to the hybrid-cloud service, on account of the client device 110a having been able to contact a local agent 120.

Consider now a case in which a user of client device 110b wishes to access the hybrid-cloud service. The user enters a command on the client device 110b, which directs the client device 110b to issue an inbound connection request 170b to a local agent 120. However, the request 170b never arrives at any local agent 120, because the firewall 132 blocks incoming connection requests directed to any local agent 120. The client device 110b thus receives no response from any local agent 120, and no silent authentication factor (such as OTT 180) is issued. Rather, the client device 110b, having received no silent authentication factor, instead requires an additional authentication factor 194, such as a passcode, biometric scan, or the like. The client device 110b gathers a second set of authentication factors, e.g., a username, password, and passcode, and sends these factors to the cloud-based server 150 in an authentication request 192b. The authentication service 164 then performs an authentication operation which, if successful, allows the user of the client machine 110b to access the cloud resource 166. The user of client device 110b thus has a relatively hard time authenticating to the hybrid-cloud service, on account of the client device 110b having been unable to contact any local agent 120.

Figure 2:
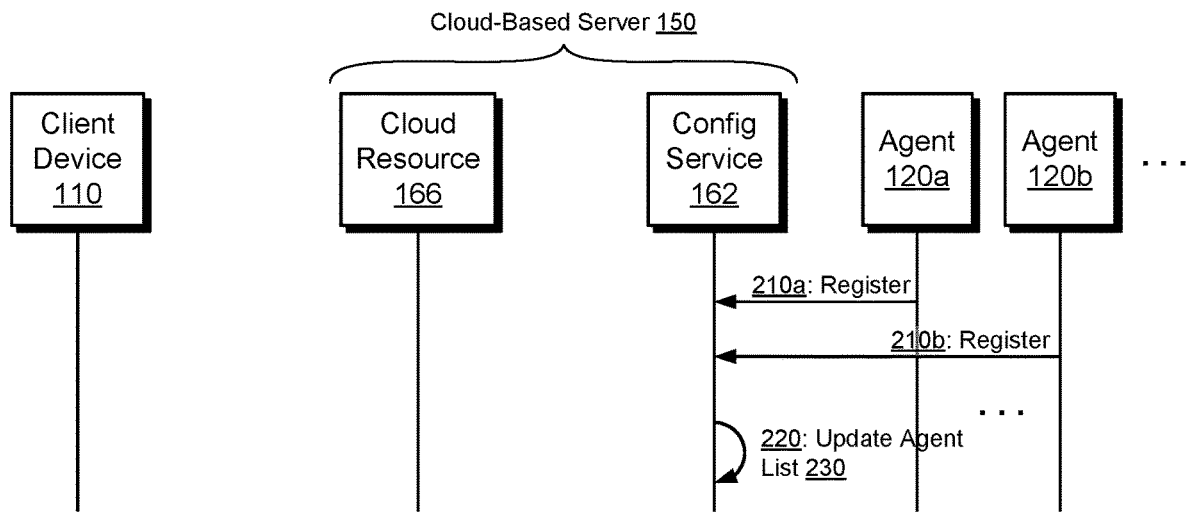
FIG. 2 is a sequence diagram that shows an example method whereby local agents running on a private intranet register with a configuration service, which is part of a cloud-based server.

FIG. 2 shows an example sequence whereby agents 120 on the private intranet 102 register with the cloud-based server 150. Here, each agent 120 (120a, 120b, etc.) sends a registration request (210a, 210b, etc.) to the configuration service 162. Each agent 120 may provide, for example, a unique identifier of that agent, an IP address at which the agent can be reached, a DNS (directory name system) name of the agent, a URL (uniform resource locator) or any other information that enables the respective agent 120 to be reached on the private intranet 102. At 220, the configuration service 162 assembles the received information into an agent list 230, which the configuration service 162 stores for future reference.

Figure 3:
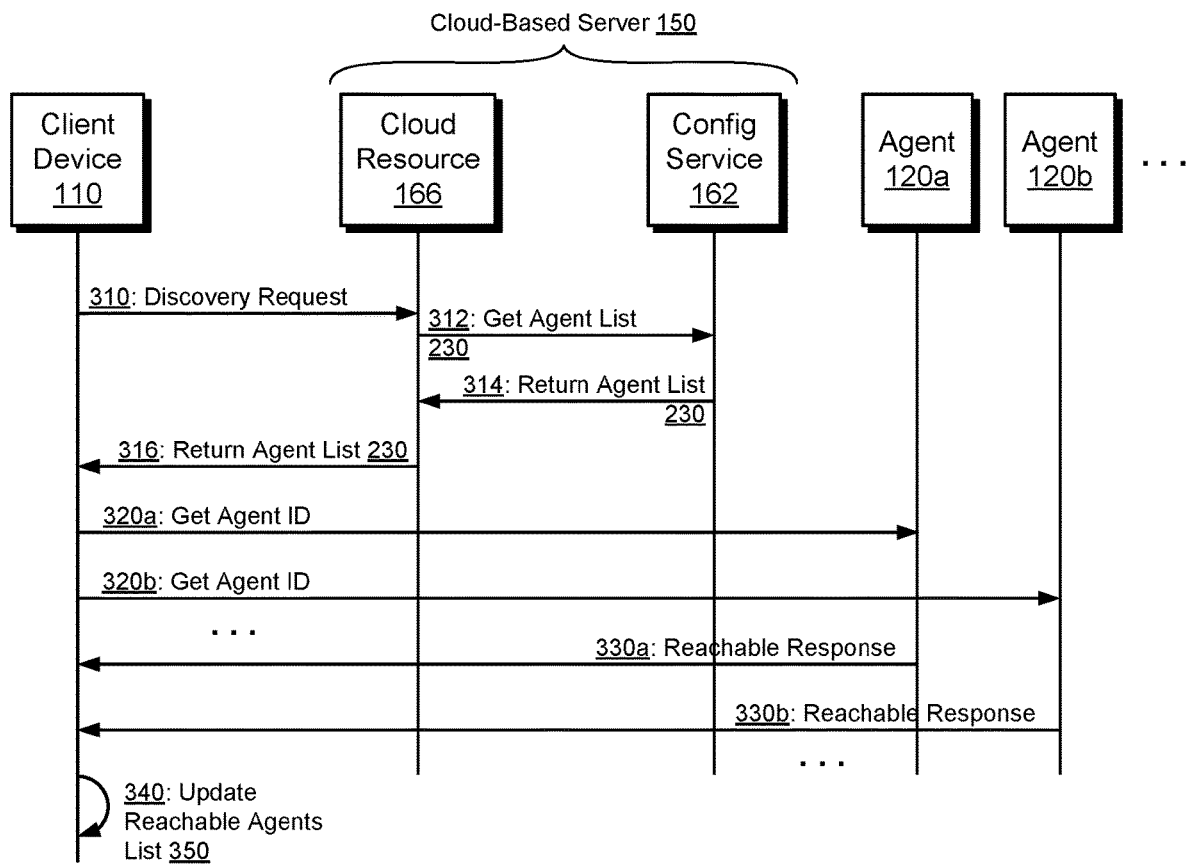
FIG. 3 is a sequence diagram that shows a method whereby a client device obtains an agent list of local agents that are registered with the configuration service and attempts to determine which registered local agents are currently reachable.

FIG. 3 shows an example sequence whereby a client device 110 obtains an agent list 230 of local agents that are registered with the configuration service 162 and attempts to determine which registered agents 120 are currently reachable. Although FIG. 3 shows particular interactions among components of the cloud-based server 150, one should appreciate that such interactions merely provide a useful example, and that any activity shown between components of the cloud-based server 150 may be alternatively regarded as internal activities, some of which can be simplified in ways that will be apparent to those skilled in the art.

At 310, the client device 110 sends a discovery request to the cloud-resource 166. The discovery request is a request to obtain the agent list 230, and in some cases additional account information. At 312, the cloud resource 166 forwards the discovery request to the configuration service 162, which responds at 314 by providing the agent list 230, which the cloud resource 166 returns to the client device 110 at 316.

As the cloud-based server 150 is connected to the public network 140 (FIG. 1), the client device 110 can send the discovery request to the cloud-based server 150 and receive a response, even if the client device 110 is not connected to the private intranet 102. Thus, discovery can proceed regardless of client location, provided the client device 110 has a connection to the public network 140.

With the agent list 230 received, the client device 110 may next attempt to discover which if any agents 110 are currently reachable. For example, at 320a, 320b, etc., the client device 110 attempts to contact respective agents 120a, 120b, etc., by sending incoming connection requests to all such agents, e.g., all agents appearing on the agent list 230. In this example, the client machine 110 is requesting the unique identifier of the agent, but any request would suffice. As the firewall 132 (FIG. 1) blocks incoming connection requests to agents 120 from the public network 140, agents 120 will be reachable only if the client device 110 is connected to the private intranet 102. If the client device 110 is connected to the private intranet 102, then any agents 120 currently running on the private intranet 102 respond (at 330a, 330b, etc.). The client device 110 keeps track of received responses, and at 340 creates a reachable agent list 350, which identifies all agents that issued responses 330a, 330b, etc., and their respective network addresses (e.g., IP addresses, URLs, DNS names, etc.).

Figure 4:
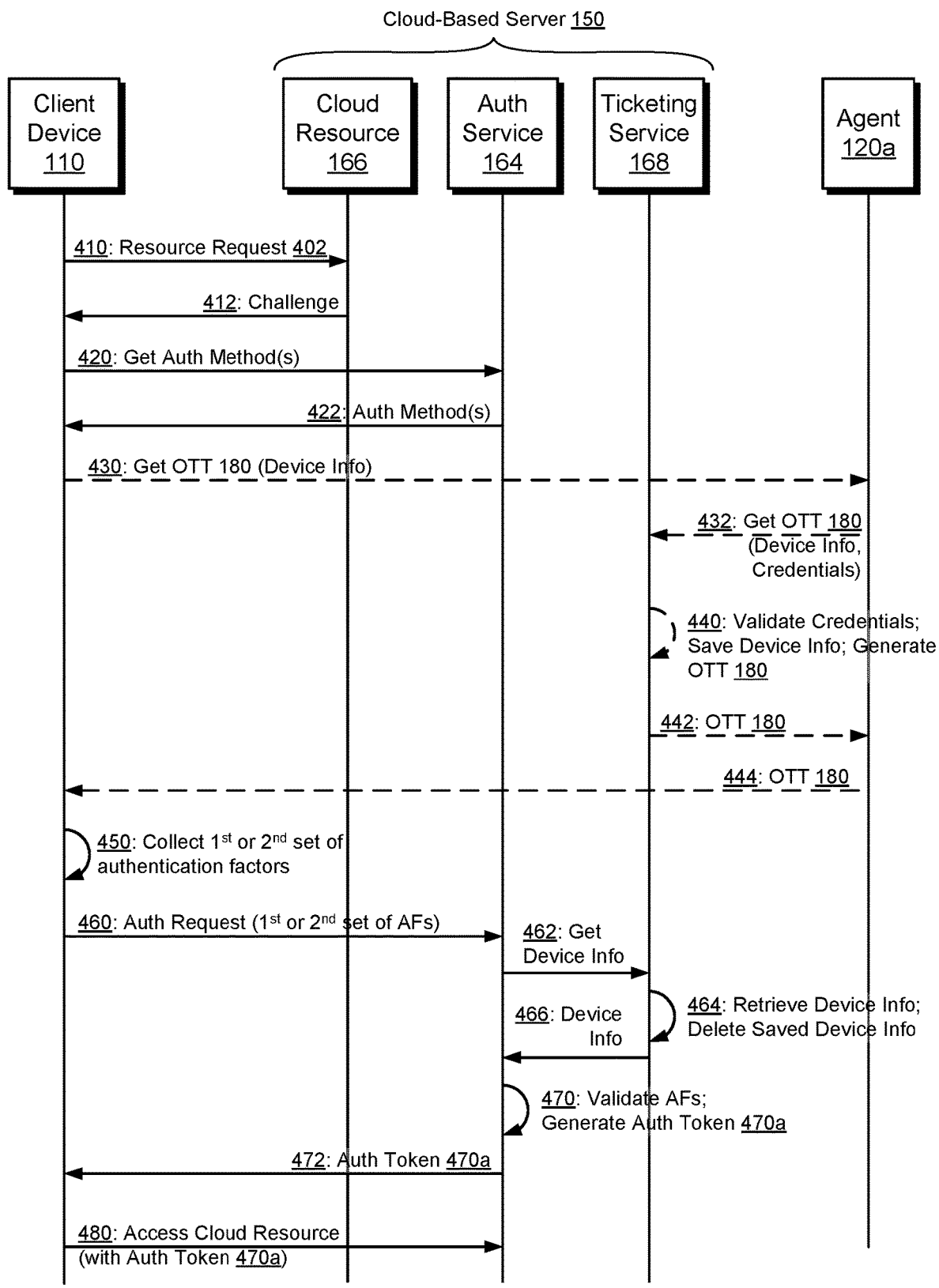
FIG. 4 is a sequence diagram that shows a method whereby the cloud-based server responds to a request to access a cloud resource by presenting different authentication requirements based on whether the client device can connect to one of the local agents.

FIG. 4 shows an example sequence whereby the cloud-based server 150 responds to a resource request 402 to access the cloud resource 166 by presenting different authentication requirements or options based on whether the client device 110 can connect to one of the local agents 120. As also shown in FIG. 1, the cloud resource 166, authentication service 164, and ticketing service 168 are all components of the cloud-based server 150. Thus, any interaction with any of these components is an interaction with the cloud-based server 150.

At 410, the client device 110 issues a resource request 402 to access the cloud resource 166. For example, a user of client device 110 may click a link or launch a program, which requires accessing the cloud resource 166. In response to the resource request 402, the cloud resource 166 replies at 412 by issuing an authentication challenge, such as an HTTP 401 error response code. In an example, the authentication challenge specifies a network location of the authentication service 164.

At 420, the client device contacts the authentication service 164, e.g., at the specified location, and provides a request to obtain available authentication methods. At 422, the authentication service 164 responds by listing the available authentication methods. These may include, for example, the first set of authentication factors 190a, which includes the OTT 180, and the second set of authentication factors 190b, which includes no OTT 180 but instead requires an additional factor 194, such as a passcode.

At 430, the client device 110, upon detecting that authentication is possible using the first set of authentication factors (including the silent factor), attempts to contact an agent 120, by sending an incoming connection request to the agent 120. The arrow for act 430 is dashed because the client device 110 may not succeed in contacting any agent 120. For example, the client machine 110 will fail to contact any agent 120 if the client device 110 is not connected to the private network 102.

Although contacting a single agent 120 would suffice, the client device 110 may nevertheless attempt to contact multiple agents 120, such as all agents appearing on the reachable agent list 350 (FIG. 3). If a response from any of the reachable agents is received (e.g., because the client device 110 is connected to the private network 102), then the reachable agent, shown here as agent 120a, responds at 432 by requesting a new OTT 180 from the ticketing service 168. The request at 432 may include device information regarding the client device 110 and credentials for accessing the ticketing service 120a.

At 440, the ticketing service 168 validates the credentials. Assuming the credentials are confirmed, the ticketing service 168 stores the device information and generates the new OTT 180. At 442, the ticketing service 168 returns the new OTT 180 to the reachable agent 120a, which, at 444, sends the OTT 180 back to the client device 110.

At 450, the client device 110, having received the OTT 180, discovers that using the first set of authentication factors 190a is an option, and proceeds to collect the first set of authentication factors 190a, e.g., by prompting the user of client device 110 for a user name and password and by adding the newly received OTT 180 as a silent authentication factor. The OTT 180 is "silent" because the user of client device 110 is not directly aware of it and does not have to perform any action to include it among the first set of authentication factors 190a. Rather, inclusion of the OTT 180 is typically automatic and transparent to the user.

At 460, the client device 110 issues an authentication request (like request 192a of FIG. 1), which specifies the first set of authentication factors 190a. At 462, upon receiving the authentication request, the authentication service 164 presents the OTT 180 to the ticketing service 168 and requests the stored device information. The ticketing service 168 validates the OTT 180, retrieves the device information at 464, and at 466 returns the device information to the authentication service 164. The ticketing service 168 also deletes the OTT 180, and/or any way of validating the OTT 180, and deletes the device information, thereby ensuring that the OTT 168 can only be used once.

At 470, the authentication service 164 validates the first set of authentication factors 190a as well as the device information. Assuming successful validation, the authentication service 164 generates an authentication token 470a, which it returns to the client device 110 at 472. At 480, the client machine 110 accesses the cloud resource 166 using the authentication token 470a. For example, the client machine 110 establishes an authenticated session with the cloud resource 166a, allowing the client machine 110 to access the cloud resource 166 as long as the token 470a is valid.

Returning back to 470, if the client device 110 receives no response from any agent 120, or receives a denial response, then no OTT 180 is issued. Instead, the client device 110 determines that using the first set of authentication factors 190a is not an option. The sequence proceeds to 450, whereupon the client device 110 collects the second set of authentication factors 190b, such as username, password, and additional factor 194, which may require the user of client device 110 to perform an additional manual action, such as entering a passcode. At 460, the client device sends an authentication request to the authentication service 164, providing the second set of authentication factors 190b.

Activity proceeds as before, but without using the OTT 180. At 470, the authentication service 164 validates the second set of authentication factors 190b and, assuming they are sufficient, generates an authentication token 470a, which is returned to the client device 110 at 472 and is used thereafter to establish an authenticated session with the cloud resource 166.

FIG. 4 thus demonstrates that authentication may proceed using either the first set of authentication factors 190a or the second set of authentication factors 190b, the primary difference being that it is easier for the user to log on using the first set of authentication factors 190a, as it includes the silent authentication factor (OTT 180) and does not require an additional manual action for entering the additional authentication factor 194.

The activities shown in FIG. 4 may be adapted to prevent a malicious user of one tenant from using an OTT 180 to qualify for easy access to resources of other tenants. For instance, a malicious user might properly obtain an OTT 180 on the intranet of Tenant A and then try to redeem that OTT 180 for accessing a resource of Tenant B. If the OTT 180 were accorded full credit in an authentication request to the resource to Tenant B, them the malicious user would be able to access those resources with a simple brute-force attack (e.g., by guessing user name and password).

To prevent this type of malicious attack, a tenant administrator may provide each agent 120 (FIG. 1) with a long-term private key that is associated with a specific tenant ID. When the agent 120 makes a request for the OTT 180 (e.g., at 432 of FIG. 4), the ticketing service 168 uses the long-term key to authenticate the tenant, i.e., to prove that the tenant sending the request is the same one that has been associated with the long-term key. The ticketing service 168 stores the verified tenant ID in connection with the newly-generated OTT 180. When this OTT 180 is later redeemed during authentication (e.g., at 460 and 462), the ticketing service 168 returns the stored tenant ID associated with the OTT 180 to the authentication service 164 (e.g., at 466). The authentication service 164 can then check that the requesting user belongs to the tenant specified by the tenant ID. For instance, the authentication service 164 checks that the tenant associated with the user's username and password matches the stored tenant ID. Only if there is a match will the user be successfully authenticated, thus preventing rogue OTT attacks.

In some examples, the ticketing service 168 may associate additional data besides Tenant ID with an OTT 180, e.g., for promoting authorization to particular resources. The additional data may include a geographic location of the agent 120 to which a client device 110 has authenticated and may be used as part of an authorization decision. For instance, a client authenticating from a head office might be more trusted than a client authenticating from a subsidiary at a remote location. The additional information might also be used to make smart policy decisions. For instance, a user coming from a more trusted location may be given a more trusted set of access policies (such as access to certain sensitive data files) than one from a less trusted location. A tenant administrator may enter geographic location information as additional metadata during an initial agent installation and associate that information with the long-term private key mentioned above. When the agent 120 later requests an OTT by authenticating to the ticketing service 168 using its long-term private key (e.g., at 432), the ticketing service 168 can retrieve the geographic location from the metadata associated with that agent 120 and include that information in the OTT 180. When the authentication service 164 redeems the OTT 180, when it is provided as part of user authentication, this metadata is returned to the authentication service 164. The authentication service 164 can then accept or reject the user authentication request based on the geographic location of the user, or apply smart access policies (such as giving access to a more sensitive set of data files based on the user location). Other metadata could also be provided along with the OTT 180 to help make authorization decisions or to enforce smart policies. Geographic location is just one example. The information could also include client device integrity and mobile device management trust state, as determined via other local services within the on-premises network, which are in close proximity to the client device 110. This information may be relayed by the agent 120 to the ticketing service 168 when the OTT 180 is requested, and may be inserted as additional metadata associated with the OTT 180.

Figure 5:
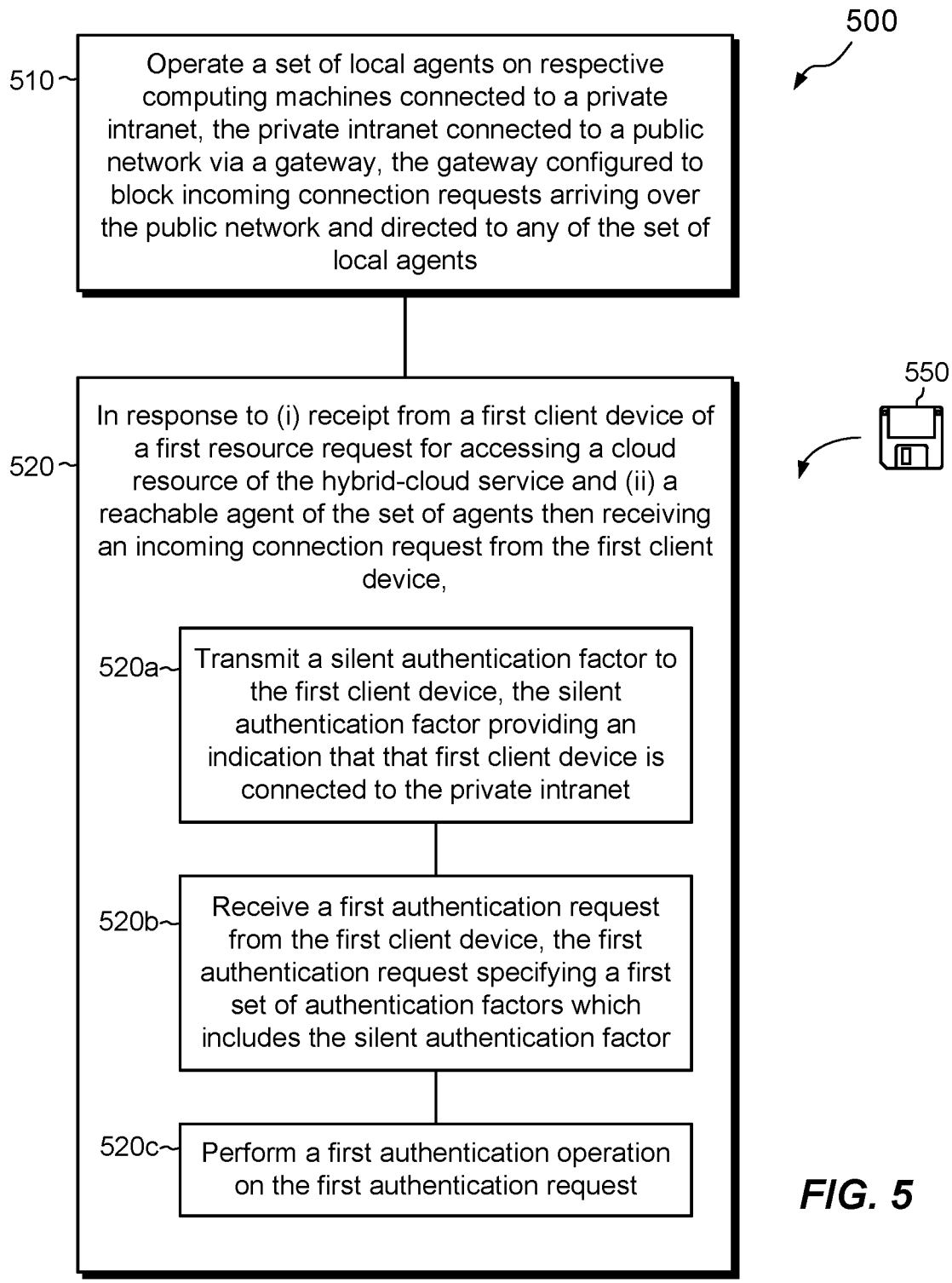
FIG. 5 is a flowchart showing an example method of authenticating users to a hybrid-cloud service.

FIG. 5 shows an example method 500 that may be carried out in connection with the environment 100. The method 500 is typically performed, for example, by the software constructs described in connection with FIG. 1, which reside in the memory 160 of the cloud-based server 150 and are run by the set of processors 154. Although it is shown as a single computer server, the cloud-based server 150 may be implemented using any number of computers and/or virtual machines. The various acts of method 500 may be ordered in any suitable way. Accordingly, embodiments may be constructed in which acts are performed in orders different from that illustrated, which may include performing some acts simultaneously.

At 510, a set of local agents 120 are operated on respective computing machines connected to a private intranet 102, the private intranet 102 connected to a public network 140 via a gateway 130, the gateway 130 configured to block incoming connection requests (e.g., via firewall 132) arriving over the public network 140 and directed to any of the set of local agents 120.

At 520, multiple activities are performed in response to (i) receipt from a first client device 110*a* of a first resource request (e.g., 402) for accessing a cloud resource 166 of a hybrid-cloud service and (ii) a reachable agent (e.g., 120*a*) of the set of agents 120 then receiving an incoming connection request 170*a* from the first client device 110*a*.

For example, at 520*a*, a silent authentication factor (e.g., OTT 180) is transmitted to the first client device 110*a*. The silent authentication factor 180 provides an indication that first client device 110*a* is connected to the private intranet 102.

At 520*b*, a first authentication request 192*a* is received from the first client device 110*a*. The first authentication request 192*a* specifies a first set of authentication factors 190*a* which includes the silent authentication factor 180.

At 520*c*, a first authentication operation (e.g., 470) is performed on the first authentication request 192*a*.

An improved technique has been described for performing authentication to a hybrid-cloud service. The technique includes selectively applying varying authentication requirements or options based on whether a client device 110 can be confirmed to be connected to a private intranet 102. The technique includes operating a set of local agents 120 on one or more computing machines on the intranet 102. When a client device 110 requests access to the hybrid-cloud service, the client device 110 attempts to contact one or more of the local agents 120. If the client device 110 succeeds in contacting a local agent 120, then the client device 110 is confirmed to be connected to the private intranet 102 and receives relatively trusting treatment during authentication. However, if the client device 110 fails to contact at least one local agent 120, the client device 110 is not confirmed to be connected to the private intranet 102 and receives relatively less trusting treatment. The improved technique thus provides a reliable way of determining whether a client device is inside or outside a private intranet, is more secure and resistant to hacking than the prior approach, and is easier to administer.

Having described certain embodiments, numerous alternative embodiments or variations can be made. For example, although embodiments have been described for use with a hybrid-cloud service, they may alternatively be applied for accessing any cloud-based service, or any server on a public network, where it is desired to provide different authentication requirements and options depending on whether a client device is connected to a private intranet.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of authenticating users to a hybrid-cloud service, the method comprising:
    operating a set of local agents on respective computing machines connected to a private intranet, the private intranet connected to a public network via a gateway, the gateway configured to block incoming connection requests arriving over the public network and directed to any of the set of local agents; and
    in response to (i) receipt from a first client device of a first resource request for accessing a cloud resource of the hybrid-cloud service, the cloud resource disposed outside the private intranet, and (ii) a reachable agent of the set of agents then receiving an incoming connection request from the first client device,
    transmitting a silent authentication factor to the first client device, the silent authentication factor providing an indication that that first client device is connected to the private intranet,
    receiving a first authentication request from the first client device, the first authentication request specifying a first set of authentication factors which includes the silent authentication factor, and
    performing a first authentication operation on the first authentication request,
    wherein the method further comprises, in response to (i) receipt from a second client device of a second resource request for accessing the cloud resource and (ii) no agent of the set of agents then receiving any incoming connection request from the second client device, (a) receiving a second authentication request from the second client device, the second authentication request specifying a second set of authentication factors, the second set of authentication factors including no silent authentication factor that indicates that the second client device is connected to the private intranet, and (b) performing a second authentication operation on the second authentication request using the second set of authentication factors.

2. The method of claim 1, further comprising blocking, by the gateway, an inbound connection request issued by the second client device, the inbound connection request from the second client device directed to a target agent of the set of local agents and arriving at the gateway over the public network, the target agent not receiving the inbound connection request issued by the second client device.

3. The method of claim 1, further comprising generating the silent authentication factor by a cloud-based server, wherein transmitting the silent authentication factor to the first client device includes sending the silent authentication factor over the public network.

4. The method of claim 3, wherein generating the silent authentication factor includes creating a one-time-token (OTT), the OTT expiring after being used in a single authentication request.

5. The method of claim 3, wherein the second set of authentication factors includes an additional authentication factor that is not one of the first set of authentication factors.

6. The method of claim 5, wherein the additional authentication factor requires a user of the second client device to perform a manual operation that is not required of a user of the first client device when providing the first authentication request.

7. The method of claim 3, further comprising:
    registering each of the set of local agents with the cloud-based server, the cloud-based server storing network addresses for each of the set of local agents; and
    in response to receiving a discovery request from the first client device, providing an agent list of the set of local agents and their respective network addresses to the first client device.

8. The method of claim 7 wherein, when receiving the inbound connection request by the reachable agent, the inbound connection request is directed to one of the network addresses on the agent list.

9. The method of claim 7, further comprising, in response to receiving a discovery request from the second client device, providing the agent list to the second client device.

10. The method of claim 1, further comprising requiring users of computing devices that are not connected to the private intranet to enter a greater number of authentication factors for accessing the cloud-based resource than users of computing devices that are connected to the private intranet.

11. An electronic system configured to operate as part of a hybrid-cloud service and comprising control circuitry that includes a set of processors coupled to memory, the control circuitry constructed and arranged to:
    operate a set of local agents on respective computing machines connected to a private intranet, the private intranet connected to a public network via a gateway, the gateway configured to block incoming connection requests arriving over the public network and directed to any of the set of local agents; and
    in response to (i) receipt from a first client device of a first resource request for accessing a cloud resource of the hybrid-cloud service, the cloud resource disposed outside the private intranet, and (ii) a reachable agent of the set of agents then receiving an incoming connection request from the first client device,
    transmit a silent authentication factor to the first client device, the silent authentication factor providing an indication that that first client device is connected to the private intranet, receive a first authentication request from the first client device, the first authentication request specifying a first set of authentication factors which includes the silent authentication factor, and perform a first authentication operation on the first authentication request, wherein the control circuitry is further constructed and arranged to, in response to (i) receipt from a second client device of a second resource request for accessing the cloud resource and (ii) no agent of the set of agents then receiving any incoming connection request from the second client device, (a) receive a second authentication request from the second client device, the second authentication request specifying a second set of authentication factors, the second set of authentication factors including no silent authentication factor that indicates that the second client device is connected to the private intranet, and (b) perform a second authentication operation on the second authentication request using the second set of authentication factors.

12. A computer program product including a set of non-transitory, computer-readable media having instructions which, when executed by control circuitry of an electronic system, cause the electronic system to perform a method of authenticating users to a hybrid-cloud service, the method comprising:

operating a set of local agents on respective computing machines connected to a private intranet, the private intranet connected to a public network via a gateway, the gateway configured to block incoming connection requests arriving over the public network and directed to any of the set of local agents; and in response to (i) receipt from a first client device of a first resource request for accessing a cloud resource of the hybrid-cloud service, the cloud resource disposed outside the private intranet, and (ii) a reachable agent of the set of agents then receiving an incoming connection request from the first client device, transmitting a silent authentication factor to the first client device, the silent authentication factor providing an indication that that first client device is connected to the private intranet, receiving a first authentication request from the first client device, the first authentication request specifying a first set of authentication factors which includes the silent authentication factor, and performing a first authentication operation on the first authentication request, wherein the method further comprises, in response to (i) receipt from a second client device of a second resource request for accessing the cloud resource and (ii) no agent of the set of agents then receiving any incoming connection request from the second client device, (a) receiving a second authentication request from the second client device, the second authentication request specifying a second set of authentication factors, the second set of authentication factors including no silent authentication factor that indicates that the second client device is connected to the private intranet, and (b) performing a second authentication operation on the second authentication request using the second set of authentication factors.

13. The computer program product of claim 12, wherein the method further comprises generating the silent authentication factor by a cloud-based server, wherein transmitting the silent authentication factor to the first client device includes sending the silent authentication factor over the public network.

14. The computer program product of claim 13, wherein generating the silent authentication factor includes creating a one-time-token (OTT), the OTT expiring after being used in a single authentication request.

15. The computer program product of claim 13, wherein the second set of authentication factors includes an additional authentication factor that is not one of the first set of authentication factors.

16. The computer program product of claim 15, wherein the additional authentication factor requires a user of the second client device to perform a manual operation that is not required of a user of the first client device when providing the first authentication request.

17. The computer program product of claim 13, wherein the method further comprises:

registering each of the set of local agents with the cloud-based server, the cloud-based server storing network addresses for each of the set of local agents; and in response to receiving a discovery request from the first client device, providing an agent list of the set of local agents and their respective network addresses to the first client device.

18. The computer program product of claim 17 wherein, when receiving the inbound connection request by the reachable agent, the inbound connection request is directed to one of the network addresses on the agent list.

19. The computer program product of claim 17, wherein the method further comprises, in response to receiving a discovery request from the second client device, providing the agent list to the second client device.

* * * * *